United States Patent
Bou-Ghannam et al.

(10) Patent No.: US 7,502,822 B2
(45) Date of Patent: Mar. 10, 2009

(54) USING COLLABORATIVE ANNOTATIONS TO SPECIFY REAL-TIME PROCESS FLOWS AND SYSTEM CONSTRAINTS

(75) Inventors: Akram Bou-Ghannam, Lake Worth, FL (US); Vishwanath Narayan, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 11/021,422

(22) Filed: Dec. 22, 2004

(65) Prior Publication Data

US 2006/0149817 A1    Jul. 6, 2006

(51) Int. Cl.
*G06F 15/16* (2006.01)
(52) U.S. Cl. ............... 709/203; 709/204; 709/220; 707/103 R; 717/140; 717/162
(58) Field of Classification Search ........ 709/203, 709/204, 220; 707/103 R; 717/140, 162
See application file for complete search history.

(56) References Cited

U.S. PATENT DOCUMENTS

| | | | |
|---|---|---|---|
| 6,539,419 B2 | 3/2003 | Beck et al. | |
| 6,718,366 B2 | 4/2004 | Beck et al. | |
| 6,973,460 B1* | 12/2005 | Mitra | 707/103 R |
| 2003/0005181 A1 | 1/2003 | Bau, III et al. | |
| 2003/0023957 A1* | 1/2003 | Bau et al. | 717/140 |
| 2004/0236830 A1* | 11/2004 | Nelson et al. | 709/204 |
| 2005/0021689 A1* | 1/2005 | Marvin et al. | 709/220 |
| 2005/0137850 A1* | 6/2005 | Odell | 704/4 |

OTHER PUBLICATIONS

Pahl, C., et al. "Ontology Support for Web Service Processes" ACM Digital Library 1-58113-743-5/03-/0009. pp. 208-216, Helsinki, Finland, 2003.
Ling, S. et al; 1999. "Constructing Interoperable Components in Distributed Systems" INSPEC, AN 6441804. pp. 274-284, Published: Los Alamitos, CA, 1999.

* cited by examiner

*Primary Examiner*—Jinsong Hu
(74) *Attorney, Agent, or Firm*—Cuenot & Forsythe, L.L.C.

(57) ABSTRACT

A method of modifying an existing standard-based system using collaborative annotations can include associating an annotation with a message of the standard-based system. The message can correspond to a first service and the annotation can specify at least one of a second service. The method further can include intercepting the message and executing the annotation. At least one of the second service can be automatically invoked according to the annotation.

11 Claims, 4 Drawing Sheets

USING COLLABORATIVE ANNOTATIONS TO SPECIFY REAL-TIME PROCESS FLOWS AND SYSTEM CONSTRAINTS

BACKGROUND

1. Field of the Invention

The present invention relates to service-based systems and, more particularly, to dynamically modifying such systems.

2. Description of the Related Art

Service-based software systems utilize an architecture that facilitates the linking of resources in an "on-demand" environment. In general, service-based software systems are configured in accordance with a specified standard. As such, these systems also can be referred to as standard-based systems. Within a service-based system, resources are made available to applications over a network as independent services. These services can be accessed by applications in a standardized way. A service-based architecture provides a more flexible, loose coupling of resources than traditional system architectures.

Despite the advantages of a service-based system, a significant amount of time and effort is required to develop such a system. Generally, a service-based software system is planned, coded, and tested extensively. With successful testing, the system can be deployed to a user base. Deployment refers to the process of ensuring that the system executes properly in the target environment. Deployment typically includes tasks such as installation, configuration, execution, further testing, and implementation of any needed changes to the system for use in the target environment.

The resulting system is intended to satisfy a set of functional and non-functional requirements. Once deployed and in operation, any changes to these requirements necessitate redevelopment of one or more portions of the system. This process can be both time consuming and costly as redesign usually requires further analysis of the system architecture, further testing, and ultimately redeployment.

As service-based architectures continue to evolve, so too has their complexity. System development and redevelopment now require more time, skill, and knowledge on the part of software developers, thereby adding to the overall cost of system development and redevelopment.

It would be beneficial to be able to modify the functionality of an existing service-based software system while avoiding the disadvantages described above.

SUMMARY OF THE INVENTION

The present invention provides a solution for modifying or altering the functionality of an existing standard-based system. One embodiment of the present invention can include a method of modifying an existing standard-based system using collaborative annotations. The method can include associating an annotation with a message of the standard-based system. The message can correspond to a first service and the annotation can specify at least one of a second service. The method further can include intercepting the message and executing the annotation. At least one of the second service can be automatically invoked according to the annotation.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a solution for dynamically modifying the operation of an existing standard-based system. In accordance with the inventive arrangements disclosed herein, an architecture is provided that allows users to add constraints to messages and/or message parameters within the standard-based system. The constraints are requirements and/or instructions that are not included, specifiable, or part of the existing standard-based system. While the constraints can add any of a variety of different functions to the existing standard-based system, in one embodiment, constraints can specify the manner in which two or more services are to interact, or cooperate, with one another. The constraints can specify an order, or sequence, in which different services are to be invoked, the conditions under which the services are to be invoked, and the number of times a service is to be invoked.

Messages exchanged in the system can be intercepted by an annotation framework layer. Once intercepted, the messages can be interpreted, with any constraints associated with the intercepted message being applied to the message in real-time or executed. This allows the functionality of the standard-based system to be modified dynamically by users without having to redevelop the existing system. Further, two or more services effectively can be "chained" together such that the services operate in a collaborative and complementary manner.

Figure 1:
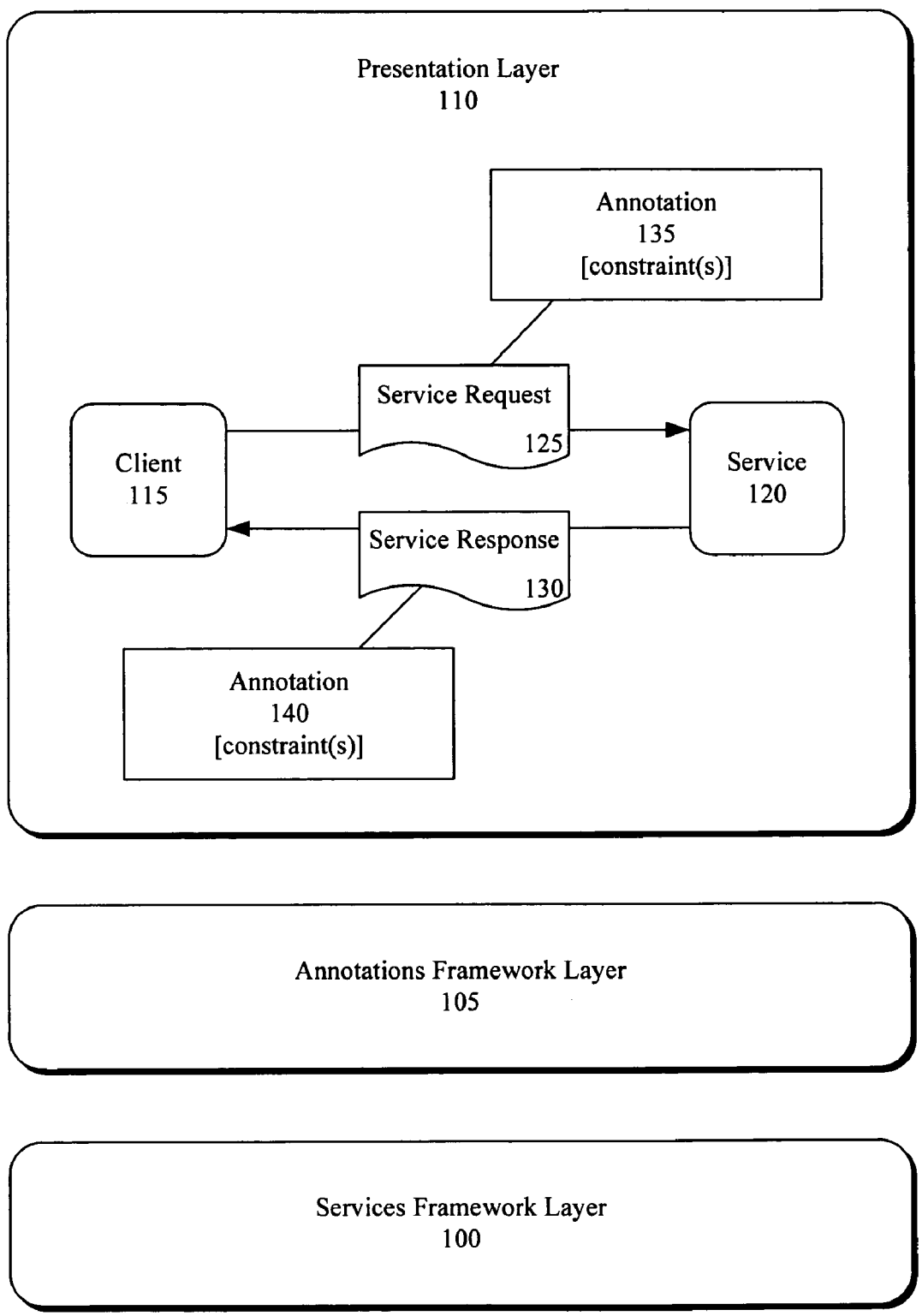
FIG. 1 is a schematic diagram illustrating a system for modifying the functionality of an existing standard-based system in accordance with one embodiment of the present invention.

FIG. 1 is a schematic diagram illustrating a system for modifying the functionality of an existing standard-based system in accordance with one embodiment of the present invention. The system can include a services framework layer 100, an annotations framework layer (AFL) 105, and a presentation layer 110. The services framework layer 100 can be part of the existing standard-based system. As used herein, a standard-based system can be one that utilizes a service oriented architecture (SOA). The standard-based system links with resources, or services, on demand. Services are made available to service requestors, referred to as clients, within a network. The services framework layer 100 provides a standardized way in which clients can access the services.

In one embodiment, the services framework layer 100 can support Web services. Web services are automated software resources that are accessed via the Internet. Typically, a Web service is accessed via its Internet Universal Resource Identifier (URI). Each Web service is described using a Web Services Description Language (WSDL) file. The WSDL file describes how to access the Web service as well as the operations performed by that service.

A WSDL file associated with a Web service describes the service as a set of endpoints operating on messages containing either document-oriented or procedure-oriented information. The operations and messages are described abstractly, and bound to a concrete network protocol and message format to define an endpoint. Related concrete endpoints are combined into abstract endpoints or services. WSDL is extensible to allow description of endpoints and messages regardless of what message formats or network protocols are used to communicate.

In another embodiment, the services framework layer 100 can support agent-based systems, for example as may be defined by specifications set forth by the Foundation for Intelligent Agents (FIPA). An agent, also referred to as an intelligent agent, is a computer program that gathers information or performs some service without immediate oversight by a user or other program. Another standard that can be supported by the services framework layer 100 can be one which relies upon autonomic entities. It should be appreciated that the services framework layer 100 can be configured to support any of a variety of different standards, so long as the selected standard provides a mechanism through which the capabilities of the system, i.e. functions, messages, and message parameters, can be exposed or read.

The AFL 105 can operate in conjunction with the services framework layer 100. As such, the AFL 105 can examine any files of the services framework layer 100 that define the capabilities of that system. In the case of a Web services environment, the AFL 105 can access and read WSDL files of the services framework layer 100 to expose or identify functions, messages, and/or message parameters of the standard-based system. As used herein, a message can refer to a service request sent from a client to a service and/or a service response sent from a service to a client.

The AFL 105 permits users to add or associate constraints with messages and/or message parameters of the services framework layer 100. While the services framework layer 100 can support different message formats, the AFL 105 allows users to associate messages or message parameters with additional constraints not previously included, supported, or defined within the service framework layer 100. That is, the constraints can specify new functionality that is not available within the existing standard-based system. These constraints can be associated with messages and/or message parameters of service requests, service responses, or both.

Once the AFL 105 has exposed the messages and message parameters of the services framework layer 100, the AFL 105 can begin intercepting messages. The AFL 105 can intercept both service requests and service responses. When a message is intercepted by the AFL 105, the constraints added to the message, if any, can be interpreted, executed, and/or applied to the message or to specific parameters of the message.

The presentation layer 110 provides a user interface through which users can specify constraints to be added by the AFL 105 to the existing standard-based system. Through the presentation layer 110, a user can associate a message and/or a message parameter with user-specified constraints through annotations. The presentation layer 110 further can graphically represent the current standard-based system to the user and graphically expose current standard-based system attributes. As such, the presentation layer 110 can graphically represent any constraints that have been added to the existing standard-based system.

As shown, the presentation layer 110 can present a visual representation of a client 115 interacting with a service provider, or service 120. Message flows between the two also are depicted. For example, a request/response transaction can be shown or illustrated through the user interface. Users can select one or more messages from transactions and associate the message(s) and/or message parameters with an annotation. Similarly, users can select a communications link between a client and a service and associate annotations therewith to be applied to any messages exchanged over that link.

In this case, the client 115 has sent a service request 125 to service 120. In response, service 120 has sent a service response 130 to client 115. The user interface indicates that service request 125 has been associated with an annotation 135. Annotation 135 specifies one or more user-added constraint(s) that were not part of the existing standard-based system. In similar fashion, the user interface indicates that the service response 130 has been associated with an annotation 140. Annotation 140 also can specify one or more user-added constraint(s) that were not part of the existing standard-based system.

The constraints can be associated with a message or message parameters of an existing standard-based system by a user. That is, the service framework layer 100 can be installed and executing. Use of the AFL 105 and the presentation layer 110 permits a user to dynamically add constraints to messages of the services framework layer 105 thereby changing its functionality. Constraints associated with intercepted messages can be interpreted by the AFL 105 and executed and/or applied to the messages in real time.

Figure 2:
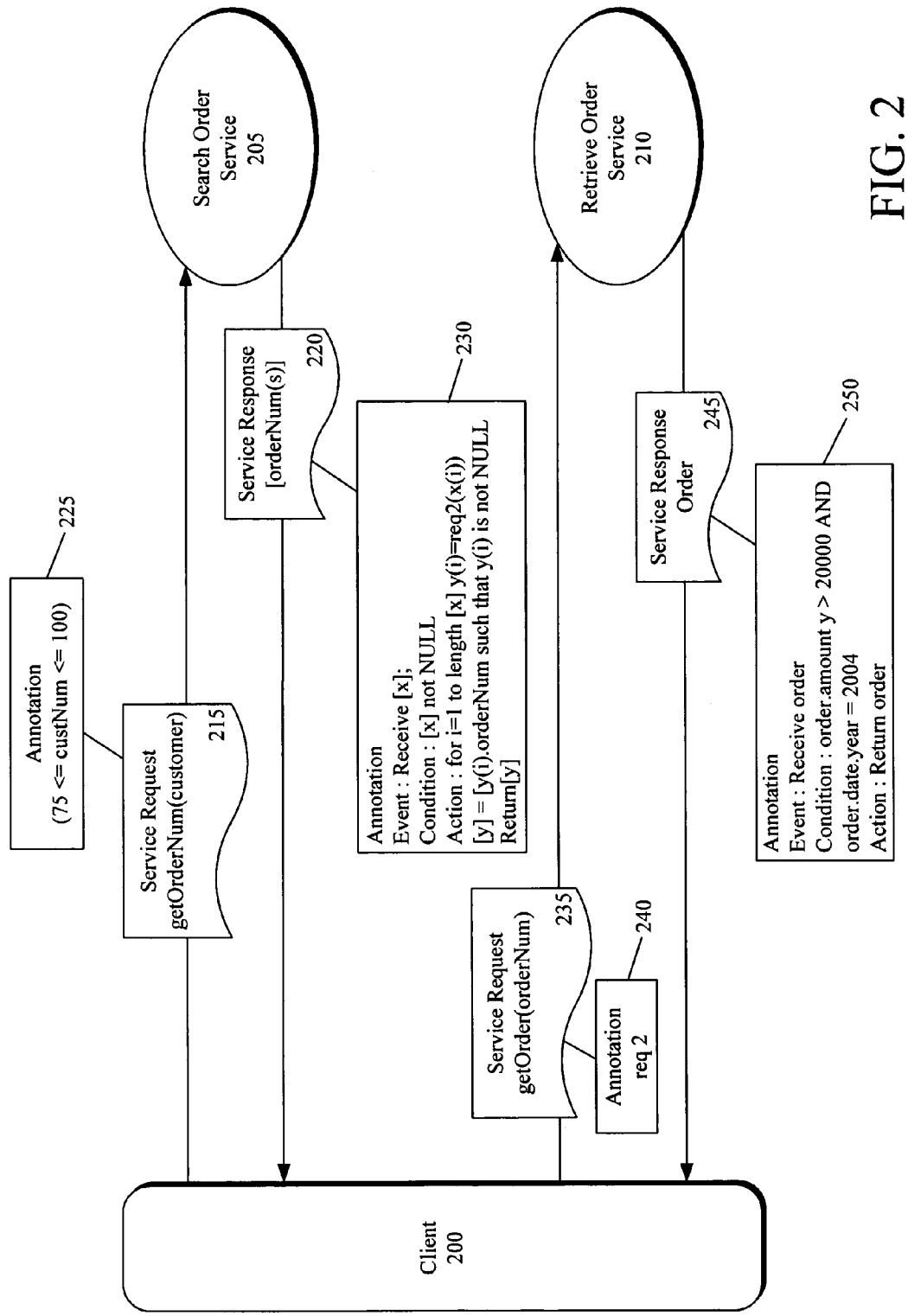
FIG. 2 is a schematic diagram illustrating annotated messages exchanged between a service requestor and service provider in accordance with another embodiment of the present invention.

FIG. 2 is a schematic diagram illustrating annotated messages exchanged between a service requestor and service providers in accordance with another embodiment of the present invention. The service providers can be located within or external to the network within which the service requester is located. FIG. 2 depicts the case where a user has dynamically added constraints to messages or message parameters in a standard-based system. For purposes of illustration, FIG. 2 will be described in the context of an order entry system with services relating thereto.

As shown, a client application (client) 200 is interacting with a search order service 205 and a retrieve order service 210. Search order service 205 can be configured to receive requests for order numbers from client 200 and provide one or more order numbers in response. The retrieve order service 210 can be configured to receive requests for particular order numbers and provide copies of the actual orders identified by the specified order numbers.

Without the use of annotations as disclosed herein, a user of client 200 would have to perform a series of manual steps to obtain a customer order. The user would enter a customer number for which to search. Results of the search would then be provided to client 200 as a list of customer order numbers. The user would examine the list and choose a particular customer order number to be included as part of a further, manually initiated service request. The client 200 would then be provided with an electronic copy of the customer order associated with the selected customer order number. The retrieved customer order then would be reviewed by the user to determine whether the retrieved customer order was the correct customer order. If not, the process would be repeated until the correct customer order was retrieved.

The present invention provides a mechanism for automating processes such as the one described above. As shown in the example of FIG. 2, client 200 has issued a service request 215 to search order service 205. The service request 215 can specify a request to obtain orders that correspond with a particular customer number. In this case, the existing standard-based system allows a user to specify only a single customer number within the service request 215. Without the use of annotations, search order service 205 would receive service request 215 specifying a single customer number and provide the order numbers associated with that customer number to the client 200 via service response 220.

In this case, the user, after the standard-based system has been configured or installed, has annotated service request 215 using the AFL and presentation layer described herein with reference to FIG. 1. The user has dynamically associated service request 215 with an annotation 225 that specifies an additional constraint to be applied to service request 215. The constraint specifies that only orders corresponding to customer numbers within a specified range of customer numbers, i.e. between 75 and 100, can be retrieved. This constraint restricts user access to order numbers associated with customer numbers that fall outside of the specified range. The constraint specified by annotation 225 illustrates how constraints can be used to enforce privacy, security, and/or otherwise restrict user access to information. In such cases, for example, a system administrator can implement the constraints.

Once annotations are specified by the user and associated with a particular message or message parameter, the AFL can intercept service request 215. The AFL checks to ensure that the customer number specified by service request 215 falls within the range of the user-specified constraint of annotation 225. If so, the AFL passes the service request 215 on to search order service 205. If not, the AFL does not pass service request 215 on to search order service 205. Instead, the AFL can notify the user that the customer order specified in service request 215 is not allowed. By associating service request 215, or a parameter of service request 215, with annotation 225, the user has dynamically altered the operation of the existing standard-based system. Upon receipt of service request 215, search order service 205 can retrieve the order numbers associated with the customer number specified by service request 215.

Service response 220 also is associated with an annotation 230. Were service response 220 not annotated as shown, the order numbers associated with the customer number specified by service request 215 would be returned to the client 200 via service response 220. Annotation 230 differs from that of 225 in that the constraints specified by annotation 230 specify an ordering of services to be invoked. The constraints of annotation 230 specify conditions or instructions for invoking the retrieve order service 210. As such, annotation 230 can be referred to as a collaborative annotation.

Rather than providing service response 220 directly to the client, the AFL can intercept the service response 220 and interpret and/or execute any constraints associated therewith. The constraints of a collaborative annotation can be specified in any of a variety of different ways. In one embodiment, an event/condition/action model can be used, though the invention is not limited to such a mechanism for specifying collaborative annotations.

Annotation 230 indicates that an array of numbers denoted as [x] is specified by service response 220. In this case [x] represents a list of order numbers returned by search order service 205. The condition of annotation 230 specifies that [x] cannot be null. That is, for annotation 230 to be executed, service response 220 must include customer order numbers for the specified customer. The action of annotation 230 specifies that a service request, denoted as "req2", is to be sent for each order number (x) on list [x]. "req2" is a variable specified by the user as an annotation on service request 235. Use of "req2" as a variable allows service request 235 to be referenced as a parameter by other collaborations as is specified in annotation 230. The retrieve order service 210 will be invoked for each order number (x).

A new list denoted as [y] is accumulated from the service response(s) 245 returned by each invocation of retrieve order service 210. Each time retrieve order service 210 is invoked with a specific order number x(i), it returns an order object y(i) as a response. The returned order response y(i) will be processed by annotation 250. That is, only orders with an amount greater than $20,000.00 and a date year of 2004 are returned. Annotation 230 extracts the order numbers from the returned orders and saves the order numbers in a list [y]. The list [y] will include the customer order number for every order returned by retrieve order service 210. The final action step of annotation 230 is to return the list of order numbers [y].

Thus, collaborative annotation 230 causes the AFL to send a service request 235 for each order number (x) specified on list [x]. Annotation 240, which is associated with service request 235, links service request 235 with the action specified in annotation 230. Notably, as service response 245 has been associated with annotation 250, the constraints specified by annotation 250 are applied to each service response 245 received as a result of invoking retrieve order service 210.

Without annotation 250, service response 245 would return a customer order corresponding to the order number specified in service request 235. Customer orders would be retrieved without regard for the amount of the order or the year in which the order was made. Annotation 250, however, specifies additional constraints to be applied to service response 245. The constraints indicate that only orders of more than $20,000.00 in value which are dated in the year 2004 are to be retrieved.

Because service response 245 was annotated with additional constraints, the AFL can intercept each service response 245 and apply the constraints specified by annotation 250. The AFL can process one or more of the results of the service response 245 in accordance with the added constraints. In this case, the AFL can review the retrieved orders and remove or filter those orders from the service response 245 that do not comply with the constraints specified by annotation 250. The user will only receive order numbers that match criteria specified in each annotation. Thus, only orders that comply with annotation 250 will be compiled during execution of annotation 230. That is, only orders for a customer number that is between 75 and 100, which are for an amount greater than $20,000.00, and which occurred in 2004 will be returned.

In another example, a user can request orders for a single customer having customer number 80. Customer 80 can have a total of 10 orders in the system, with only 5 of the 10 orders being dated in 2004 and having an order amount greater than $20,000. Annotation 250 will cause the AFL to intercept the response and implement the constraints specified therein. Thus, the retrieve order service 210 will be called 10 times, once for every order number associated with customer 80. The retrieve order service 210, however, will only return the orders that have an amount greater than $20,000 and which are dated in 2004. Accordingly, the search will only return the 5 order numbers that match the stated criteria.

FIG. 2 illustrates how a user of an existing standard-based system can dynamically change the behavior of the system by associating messages and/or message parameters with additional constraints. This can be performed dynamically, i.e. after the standard-based system has been compiled, implemented, and/or installed, at runtime without further modification to the system. It should be appreciated that constraints can be implemented and remain in place for a single interaction with a service, for multiple interactions, or until removed.

Figure 3:
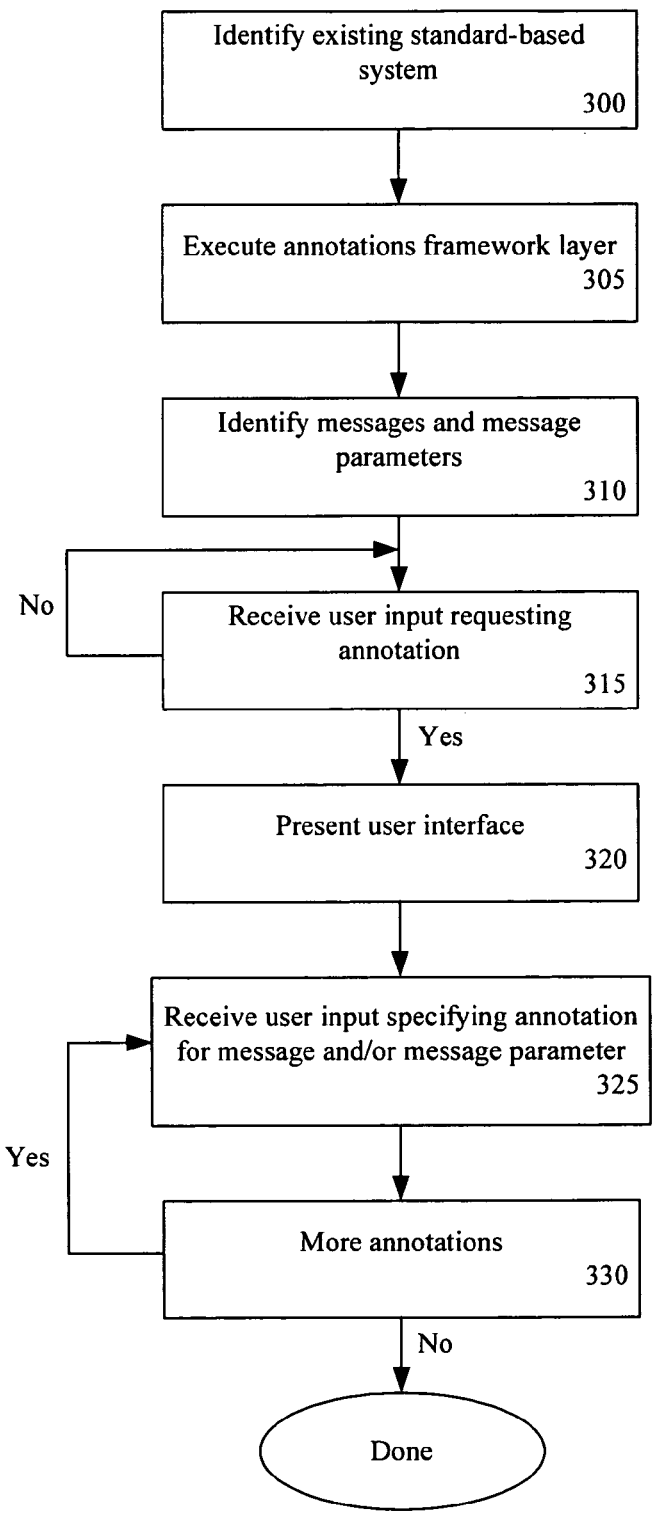
FIG. 3 is a flow chart illustrating a method of adding annotations to an existing standard-based system in accordance with another embodiment of the present invention.

FIG. 3 is a flow chart illustrating a method of dynamically adding annotations to an existing standard-based system in accordance with another embodiment of the present invention. The method can begin in step 300 where an existing standard-based system is identified. The standard-based system can be pre-installed and/or executing within one or more computer systems.

In step 305, the AFL can be executed. The AFL can execute in conjunction with the standard-based system. In step 310, the AFL can identify messages and message parameters of the standard-based system. As noted, any documents including, but not limited to, WSDL files, can be analyzed to expose the messages and parameters of the messages used within the standard-based system to request services and receive responses from services. With respect to agent-based systems, for example, files formatted in an Agent Communication Language (ACL) which define syntax and semantics for agent interaction can be examined. One example of an ACL can include Knowledge Query Manipulation Language (KQML).

In step 315, a determination can be made as to whether user input requesting the addition of an annotation has been received. If so, the method can proceed to step 320. If not, the method can continue to loop through step 315 until such time as an input is received or another event causing the program to exit the loop or end is received (not shown).

In step 320, in the case where a request to associate an annotation with a message is received, a user interface to the AFL can be presented. In step 325, a user input specifying an annotation can be received. Through the user interface, a user can view messages and individual message parameters. In one embodiment, representations of service request and service response transactions can be presented. The interface allows a user to select a particular message, message parameter, and/or communication link between a client and service, and associate the selected object with one or more constraints forming an annotation that becomes associated with the message. The constraints specified by an annotation are not originally included or specified within the standard-based system.

In one embodiment, the annotation can specify one or more constraints to be applied to a message or to a parameter of a message. In another embodiment, the annotation can be collaborative in nature. In that case, the constraint(s) of the annotation can be instructions for invoking one or more different services. The constraints can specify the conditions under which those services are to be invoked and how many times. As noted, a collaborative annotation can specify an event, a condition, and/or an action. It should be appreciated, however, that other techniques for specifying instructions to be executed by the AFL also can be used and that the present invention is not limited to the use of an event/condition/action model.

In step 330, a determination can be made as to whether further annotations are to be associated with messages. If so, the method can loop back to step 325 to receive further annotations. If not, the method can end.

Figure 4:
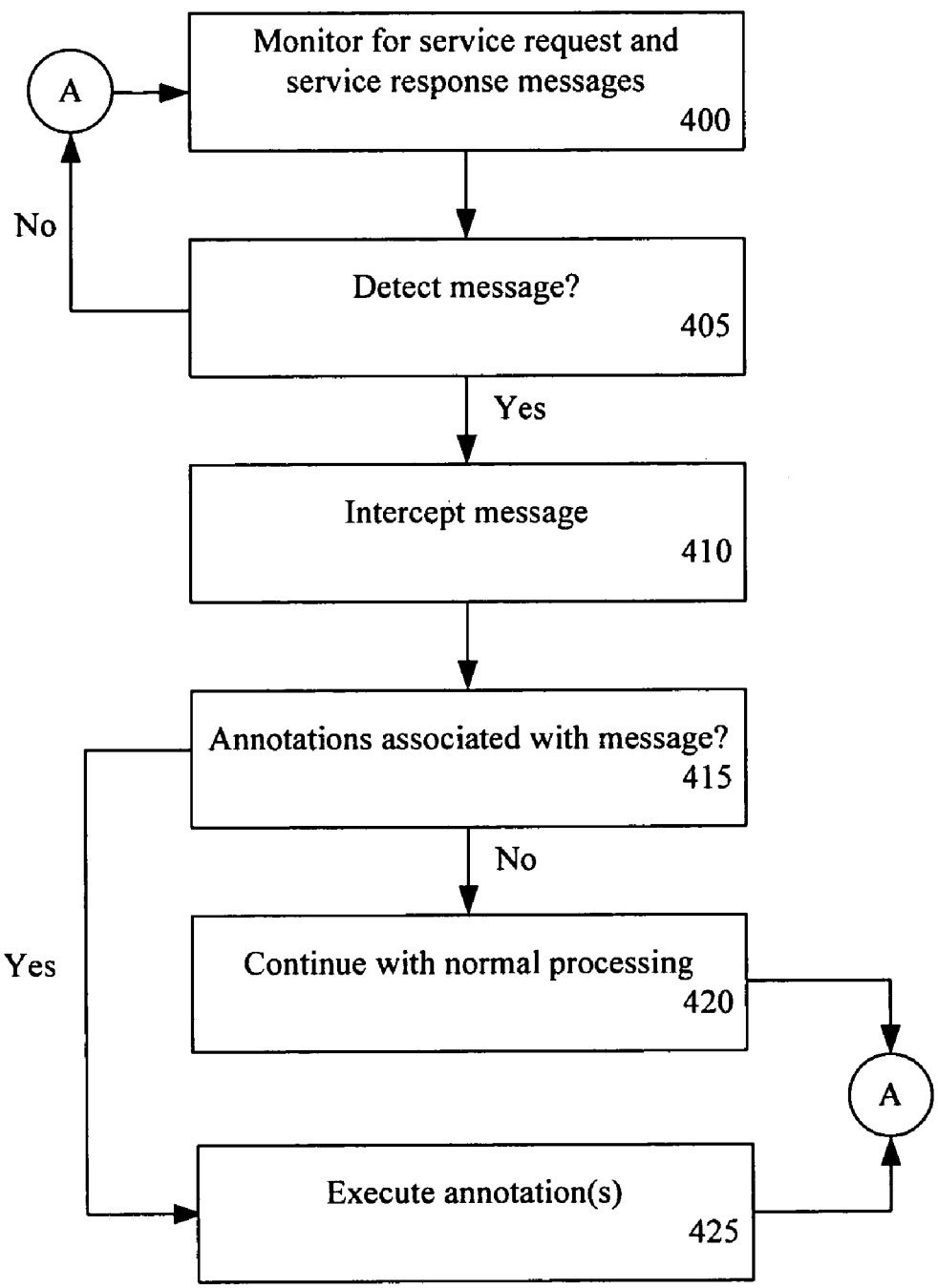
FIG. 4 is a flow chart illustrating a method of processing messages having annotations associated therewith in accordance with yet another embodiment of the present invention.

FIG. 4 is a flow chart illustrating a method of processing messages having collaborative annotations associated therewith in accordance with yet another embodiment of the present invention. The method can begin in a state where the AFL has been configured to operate with an existing standard-based system. In step 400, the AFL can begin monitoring for service request and service response messages.

In step 405, a determination can be made as to whether a message has been detected. If not, the method can loop to step 400 to continue monitoring for messages. If a message has been detected, the method can proceed to step 410 where the detected message can be intercepted. In step 415, a determination can be made as to whether the message has been associated with an annotation. Service requests and service responses can be analyzed by the AFL to determine whether the message has been associated with one or more annotations.

If the intercepted message has been associated with an annotation, the method can proceed to step 425. If not, the method can proceed to step 420 where normal processing continues. For example, if the message is a service response, the message can be passed on to the intended client. If the message is a service request, the message can be passed on to the intended service.

Continuing with step 420, in the case where the message has been associated with an annotation, any constraints specified by the annotation can be applied to the message and/or executed. For example, in the case of a constraint relating to a service request, the message parameter, or parameters, affected by the constraint can be modified by the AFL in accordance with the constraint(s). In the case where the constraint relates to a service response, the AFL can process the message to perform any filtering of the results in the service response that may be required in accordance with the constraint(s). If the constraint corresponds to a collaborative annotation, the constraints specified therein can be executed. Executing the collaborative constraint can include invoking another service one or more times, intercepting responses from that service, and/or processing the results of one or more service responses.

After either step 420 or step 425, the method can continue monitoring for further messages until such time as the AFL is halted or stopped responsive to some other predetermined event. It should be appreciated that while the case of a single annotation has been described, the method of FIG. 4 also can be applied in cases where annotation execution and application are performed in a nested fashion as was described with reference to FIG. 2.

The methods described herein have been provided for purposes of illustration. As such, neither should be construed as a limitation of the present invention. For example, one or more of the steps described with reference to FIG. 3 or 4 may be performed in a different order than described herein. Further, the procedures described with reference to FIGS. 3 and 4 can be performed simultaneously such that the system continues to monitor for annotated messages while a user continues to associate new constraints with messages and/or message parameters of the standard-based system.

In another embodiment of the present invention, the AFL can be configured to create new services if so desired by a user. The new services can be built from older or existing services, that may or may not be annotated. A new service can rely upon a combination or ordering of existing services to satisfy new constraints. As viewed through the presentation layer, a new service can appear or be presented as a single service rather than as an amalgamation of a plurality of services. Accordingly, new flows can be generated that utilize both new and old services.

The inventive arrangements disclosed herein provide a method, system, and apparatus that facilitates the modification of an existing standard-based system. Through the present invention, users can dynamically annotate existing system messages to alter the functionality of the standard-based system. By incorporating collaborative annotations, two or more services can be made to function in an automated and cooperative manner. Such changes can be implemented without having to recompile or redesign the system and can be added by a user at runtime of the standard-based system.

Further, users can add constraints to messages in real-time thereby allowing real-time interpretation of annotated messages.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, program, software, or software application, in the present context, means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of modifying an existing standard-based system during runtime of the standard-based system using collaborative annotations comprising:

displaying, at runtime of the standard-based system, representations of a client of the standard-based system, a first Web-based service providing services to the client, and message types exchanged between the client and the first Web-based service comprising a service request sent from the client to the first Web-based service and a service response sent from the first Web-based service to the client;

responsive to a received user input selecting at least one message type exchanged between the client and the first Web-based service, associating an annotation with the selected message type of the standard-based system, wherein the selected message type corresponds to the first Web-based service and the annotation specifies at least one of a second Web-based service and at least one condition for invoking the at least one of the second Web-based service;

intercepting a message exchanged between the client and the first Web-based service and determining whether the message corresponds to the selected message type;

when the message corresponds to the selected message type, executing the annotation; and automatically invoking the at least one of the second Web-based service responsive to determining that the message meets the condition for invoking the at least one of the second Web-based service specified by the annotation, and when the message does not meet the condition for invoking the at least one of the second Web-based service specified by the annotation, not executing the at least one of the second Web-based service.

2. The method of claim 1, wherein the condition is not a specifiable option within the standard-based system.

3. The method of claim 1, wherein the annotation specifies an order of invocation for a plurality of Web-based services.

4. The method of claim 1, wherein the annotation specifies at least one of an event, a condition, and an action.

5. The method of claim 4, further comprising selectively executing the action if the condition is met.

6. The method of claim 1, further comprising presenting a representation of a new service through a graphical user interface, wherein the new service is comprised of the first Web-based service and the at least one of the second Web-based service, wherein the second Web-based service is selectively executed according to the condition specified by the annotation.

7. The method of claim 1, wherein said associating step occurs at runtime of the standard-based system.

8. The method of claim 1, wherein the message is a service response from the first Web-based service, said method further comprising preventing the service response from reaching an intended client.

9. The method of claim 8, further comprising:

extracting at least one result from the service response; and incorporating the at least one result in a service request that invokes the at least one of the second Web-based service.

10. The method of claim 9, further comprising:

receiving a plurality of results from the at least one of the second Web-based service;

accumulating the results of the first Web-based service and the at least one of the second Web-based service according to the annotation; and providing the accumulated results to the client.

11. The method of claim 8, further comprising:

extracting at least one result from the service response; and selecting the at least one of the second Web-based service from a plurality of Web-based services according to the at least one result and the annotation.

* * * * *